Patented July 27, 1954

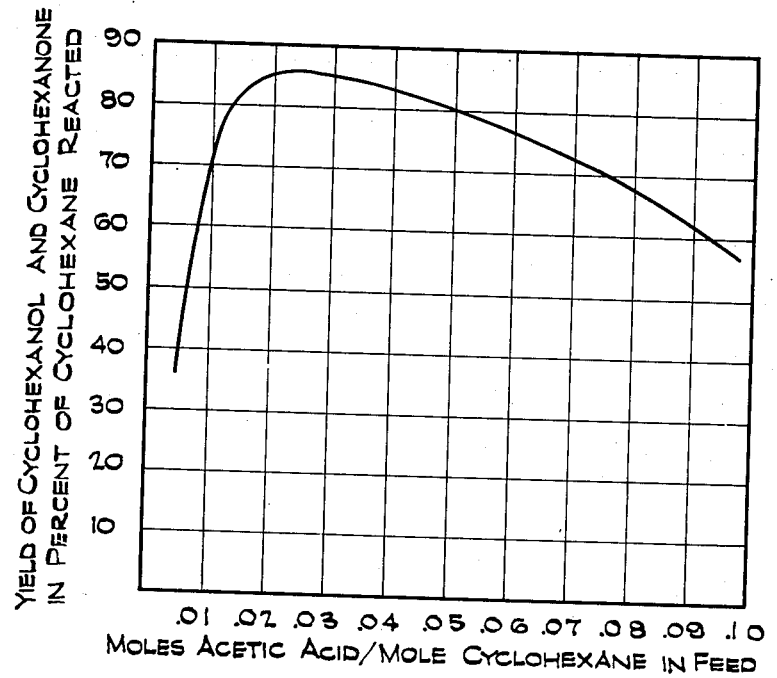
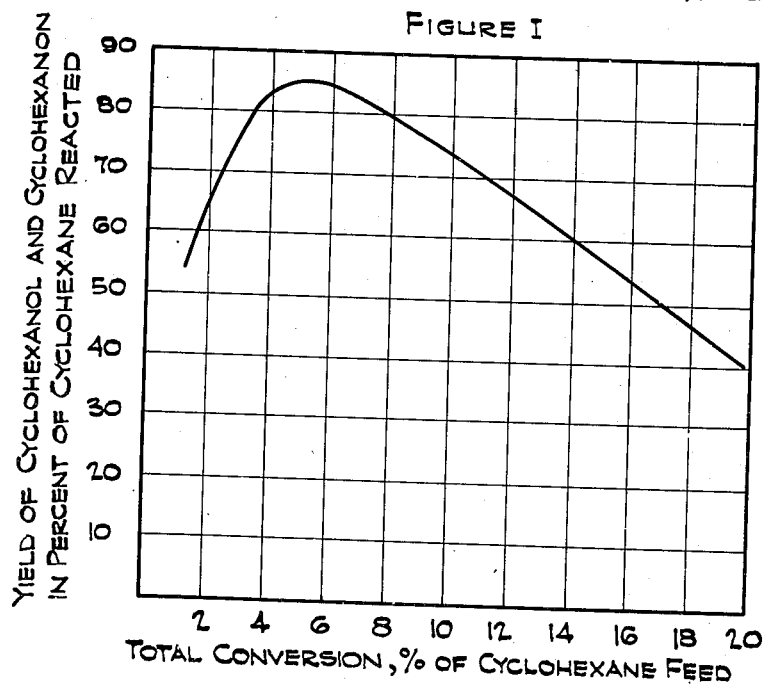

2,684,984

UNITED STATES PATENT OFFICE 2,684,984

PRODUCTION OF CYCLIC ALCOHOLS AND KETONES

Harry de V. Finch, Berkeley, and Kenneth E. Furman, Richmond, Calif., assignors to Shell Development Company, Emeryville, Calif., a corporation of Delaware Application March 31, 1952, Serial No. 279,502

9 Claims. (Cl. 260—586)

This invention relates to the oxidation of saturated cyclic hydrocarbons to reaction products comprising cyclic alcohols and ketones corresponding to said cyclic saturated hydrocarbons. A specific aspect of the invention relates to the controlled oxidation of cyclohexane to reaction products consisting essentially of cyclohexanone and cyclohexanol.

The cyclic alcohols and ketones are of importance in many fields of application. They are used as solvents and constitute a source for the production of many valuable chemical derivatives. Processes have been disclosed heretofore for the production of reaction mixtures containing cyclic alcohols and ketones by the oxidation of alicyclic organic compounds including cycloparaffins. Such processes are, however, often handicapped by serious difficulties detracting materially from efficient large scale operation. Yields of the desired alcohols and ketones are often low. Due to operating conditions employed in many of the processes disclosed heretofore, the reaction mixtures obtained are of a complexity rendering difficult and costly the separation therefrom of specific alcohols or ketones in a high state of purity. A disadvantage inherent in many of the processes available heretofore is the use of catalysts, or promoters, the presence of which often occasions additional operative steps, the complexity or difficulties of which add materially to the overall costs of the operation. Liquid phase operations with the aid of solid catalytic materials generally employ the catalyst in the form of finely divided suspensions which not only increases the complexity of catalyst recovery and of product separation and purification, but also renders exceedingly difficult the maintenance of the essential distribution of the indispensable catalyst constituents within the reaction zone.

It has now been found that saturated cyclic compounds such as, for example, the cycloparaffins, are oxidized efficiently in the liquid phase to reaction products consisting essentially of the corresponding cyclic alcohols and cyclic ketones by effecting the oxidation in the presence of well defined optimum amounts of a monobasic carboxylic acid under conditions of operation defined fully herein.

Processes have been disclosed heretofore wherein organic compounds are oxidized in the presence of certain oxygen-containing organic compounds. However, in processes disclosed heretofore such oxygen-containing materials are generally employed not only in substantial amounts but in the presence of added catalysts. The present invention, however, enables the oxidation of saturated cyclic compounds to be carried out efficiently in the absence of any added catalytic material other than exceedingly small amounts of a carboxylic acid.

Although the invention is broadly applicable to the oxidation of alicyclic organic compounds, such as the cyclic paraffins, to the corresponding alcohols and ketones, it is applied with particular advantage to the oxidation of cycloparaffins consisting essentially of cyclohexane to cyclic alcohols and ketones comprising cyclohexanone and cyclohexanol. The following detailed description of the invention is therefore made with particular reference to the oxidation of cycloparaffins consisting essentially of cyclohexane to reaction products comprising cyclohexanone and cyclohexanol.

In the detailed description of the invention, reference is made to the attached drawing forming a part of the present invention, wherein Figure I is a graph indicating the effect upon the yield of desired cyclic alcohols and ketones of variations in the amount of acetic acid in the cycloparaffin charge, and Figure II is a graph showing the relationship of yield of cyclohexanol and cyclohexanone to total conversion, in the liquid phase oxidation of cyclohexane.

Oxidation of the saturated cyclic hydrocarbons, in accordance with the invention is effected in the liquid phase by passing a gaseous stream containing molecular oxygen, through the cyclic hydrocarbon while in the liquid state, under the conditions of operation defined hereinbelow. Suitable molecular oxygen-containing streams comprise, for example, air or any other suitable oxygen-containing gas, or even oxygen itself. Oxidation is carried out at a temperature in the range of, for example, from about 100° C. to about 180° C., and preferably at a temperature of from about 140° C. to about 165° C. The absence of added catalytic material fails to result in the obtaining of yields of the desired cyclic alcohols and ketones commensurate with efficient practical scale operation. It has been found, however, that the addition of a carboxylic acid in only exceedingly small but well defined amounts, in the absence of any other added catalytic material, results in highly efficient oxidation of the cycloparaffin to the desired cyclic alcohols and ketones. Carboxylic acids which may be employed in accordance with the process of the invention comprise the aliphatic monobasic carboxylic acids which are liquid or soluble in the charge under the conditions of execution of the reaction. Such suitable monobasic carboxylic acids comprise, for example, those having from 1 to 6 carbon atoms to the molecule. Those having from 1 to 4 carbon atoms are particularly preferred. Examples of such suitable carboxylic acids comprise, for example, formic, acetic, caproic, valeric, propionic, butyric, etc. acids. It has been found that the presence of the aliphatic monobasic carboxylic acid in only exceedingly small, but well defined, amounts is essential to the attainment of the objects of the present invention. The oxidation of the cycloparaffin, such as, for example, cyclohexane, in accordance with the invention is effected in the presence of an amount of the carboxylic acid ranging from about 0.005 to about 0.1, and preferably from about 0.01 to about 0.05 mole of the acid per mole of the cyclohexane. Of the above-defined carboxylic acids the use of acetic acid is particularly preferred. The advantages inherent in the use of this specific carboxylic acid reside not only in its unusual effectiveness when present in relatively small concentrations, but in its ability to form an azeotrope with the cyclohexane, thereby greatly facilitating product separation and recycle of the acid to the reaction zone. Since, under the conditions of execution of the oxidation in accordance with the invention little, if any, of the acetic acid is destroyed, and it is easily removed from the reaction products as the azeotrope with the unreacted cyclohexane, and returned therewith to the reaction zone, the process proceeds with a minimum of operative steps relating to catalyst handling and at a minimum of catalyst cost.

The effect of the aliphatic monobasic carboxylic acid such as, for example, acetic acid, in promoting the cycloparaffin oxidation to the desired cyclic alcohols and ketones is evidenced by the following examples:

*Example I*

3.70 moles of cyclohexane was oxidized in the liquid phase by the passage of air therethrough at 145° C. and at a pressure of 120 p. s. i. g. for a period of 200 minutes. Rate of flow of the air stream through the cyclohexane was 2.2 moles of air per hour. Fractionation of the resulting reaction mixture yielded 3.58 moles of unreacted cyclohexane, 0.044 mole cyclohexanone and 0.006 mole of cyclohexanol. This is equivalent to a yield of 42% of cyclohexanone and cyclohexanol based on cyclohexane reacted. The operation was thereupon repeated under substantially identical conditions but with the exception that acetic acid in an amount of 0.019 moles of acetic acid per mole of cyclohexane was added to the charge and the reaction time was reduced to 100 minutes. The yield of cyclohexanone and cyclohexanol obtained was 89% based on the cyclohexane reacted, notwithstanding the substantial reduction in reaction time.

The effectiveness of the acetic acid in promoting the desired oxidation only when employed in small amounts lying within a well defined range is evidenced by the following example:

*Example II*

In a plurality of separate operations, cyclohexane was oxidized in the presence of added acetic acid at a temperature of 145° C., a pressure of 120 p. s. i. g. and a contact time of 100 minutes. The content of cyclohexanone and cyclohexanol in the reaction mixture obtained in each operation was determined by analysis. Each of the separate operations in the plurality of individual runs was carried out under substantially identical conditions with the exception that the amount of acetic acid added to the charge in each operation differed. By plotting acetic acid in the feed, in moles of acetic acid per mole of cyclohexane, against the yield of cyclohexanone and cyclohexanol in the reaction products, there is obtained the curve set forth in Figure I of the attached drawing.

It is seen therefrom that use of the carboxylic acid in amounts exceeding about one-tenth mole acetic acid per mole of cyclohexane will result in substantial progressive diminution in yield of the desired cyclic alcohols and ketones. It is furthermore apparent that an optimum range, resulting in substantial improvements in yield, is found between about 0.01 and about 0.05 mole of acetic acid per mole of cyclohexane. In accordance with the invention the oxidation is executed in the presence of an added amount of carboxylic acid, for example, acetic acid, equal to from about 0.005 to about 0.1 mole, and preferably from about 0.01 to about 0.05 mole, of the added acid per mole of cyclic hydrocarbon charge.

It has also been found that substantial improvement in the efficiency with which the cycloparaffin oxidation is effected, as reflected by substantial improvement in yield of the desired cyclic alcohols and ketones, is obtained by limiting the total conversion within a well-defined range as evidenced by the following example:

*Example III*

In a series of separate operations cyclohexane was oxidized at a temperature of 145° C. and a pressure of 120 p. s. i. g. An amount of acetic acid equal to 0.018 mole of acetic acid per mole of cyclohexane was added to the oxidation charge. Reaction products were analyzed. Plotting the total conversion, in terms of percent of cyclohexane fed, against the yield of cyclohexanol and cyclohexanone, in terms of percent of cyclohexane reacted, for each of the individual operations results in the obtaining of the relationship shown by the graph of Figure II of the attached drawing.

It is seen therefrom that substantially improved yields of the desired cyclic ketones and cyclic alcohols are obtained by maintaining the total conversion, in terms of percent of cyclohexane fed, below 20% and preferably in the range of from about 2 to about 10%. In accordance with the process of the invention, the oxidation of a cycloparaffin such as, for example, cyclohexane, to a reaction mixture consisting essentially of the corresponding cyclic alcohols and ketones is, therefore, preferably effected under conditions wherein the total conversion is maintained in the range of from about 2 to about 20%, and still more preferably from about 2.5 to about 10% in terms of cyclohexane fed. In a particularly preferred method of carrying out the oxidation of cyclohexane in accordance with the invention total conversion in terms of the cyclohexane charged is maintained at about 5%.

The time of contact employed in oxidizing the cycloparaffins in accordance with the invention will vary in accordance with specific operating conditions employed. A time of contact in the range of, for example, from about 30 to about 250 minutes, and preferably in the range of from about 50 to 180 minutes may be employed. The time of contact within this range particularly preferred in a specific operation is generally governed by the total conversion of cyclohexane to cyclic ketones and alcohols which it is desired to obtain.

The process of the invention may be executed batchwise or continuously. The reaction may be carried out in a reaction zone comprising any suitable conventional type of reactor enabling efficient contact of the gaseous oxygen-containing stream with the liquid alicyclic compound under the above-defined conditions. Suitable reactors comprise, for example, an enlarged chamber or column wherein a high liquid level of the liquid reactant is maintained, and through which the oxygen-containing stream is passed with the aid of suitable means such as, for example, a nozzle, porous plate, or the like, positioned in the lower part of the reactor. The cyclic hydrocarbon charge and optionally the oxygen-containing gaseous stream may be preheated prior to their introduction into the reactor. Additional means enabling the addition or withdrawal of heat from the reactor contents are provided. The carboxylic acid employed in accordance with the process of the invention may be added in part or in its entirety to the cyclic hydrocarbon stream or to the gaseous oxygen-containing stream prior to their introduction into the reaction zone, or a part or all of it may be separately introduced into the reaction zone.

Effluence from the reactor is passed to a suitable product separating zone wherein it is subjected to product separating means to effect the separation of the desired cyclic ketones, alcohols and unconverted alicyclic charge, as well as carboxylic acid, therefrom. Within the product separating zone the reactor effluence is subjected to conventional means directed to the resolution of the mixture which may comprise one or more such steps as, for example, stratification, distillation, extractive distillation, fractionation, absorption, solvent extraction, and the like.

A particular advantage inherent in the use of acetic acid as the monobasic carboxylic acid, in the oxidation of the cycloparaffins in accordance with the invention resides in the ability of the acetic acid to form a constant boiling mixture with the unconverted cycloparaffin. Thus, acetic acid and cyclohexane form an azeotropic mixture containing 0.028 moles of acetic acid per mole of cyclohexane, which boils at 79.7° C. In the oxidation of cyclohexane in the presence of acetic acid in accordance with the invention unconverted cyclohexane and acetic acid are distilled from the products as an azeotrope leaving as residue products consisting essentially of cyclohexanone and cyclohexanol. When operating conditions employed are such as to result in a reactor effluent containing insufficient unconverted cyclohexane to remove all acetic acid overhead in the initial product distillation a portion of the cyclohexane charge to the system may be introduced into the initial product distillation zone in an amount sufficient to entrain substantially all of the acetic acid overhead as the cyclohexane-acetic acid azeotrope. The acetic acid-cyclohexane azeotrope separated from the reactor effluence is recycled to the reaction zone. The residue from the initial product distillation consisting essentially of cyclohexanol and cyclohexanone, now substantially free of the carboxylic acid willfully introduced into the reaction zone, is passed to further product separating means comprising, for example, a distillation step directed to the separation of the cyclic alcohol from the cyclic ketone.

It is thus seen that the process of the invention provides a highly efficient process for the oxidation of cyclohexane to reaction products consisting essentially of cyclohexanone and cyclohexanol with the use as catalyst of only exceedingly small amounts of aliphatic monobasic carboxylic acid, such as acetic acid, and wherein high yields of the desired cyclic alcohols and ketones are obtained in the absence of the need for any catalytic material other than the exceedingly small amounts of the monobasic carboxylic acid. The process is executed in the complete absence of difficulties and expenditures generally encountered in processes employed heretofore as a result of the complex operative procedures which must of necessity often be resorted to therein to maintain the catalyst within the reaction zone.

Although in the foregoing detailed description of the invention stress has been placed upon the use of acetic acid as the monobasic aliphatic carboxylic acid employed, it is to be understood that the invention is in no wise limited to the use of only this preferred acid, and that other monobasic aliphatic carboxylic acids as defined above may be used as evidenced by the following examples:

*Example IV*

A mixture consisting essentially of 3.67 moles of cyclohexane and 0.065 moles of valeric acid was maintained at a temperature of 145° C. and under a pressure of 120 p. s. i. g. while air was passed therethrough at a rate of 2.1 moles per hour. A contact time of 100 minutes was used. Distillation of the resulting reaction products resulted in the obtaining of 3.48 moles of unreacted cyclohexane, 0.098 moles of cyclohexanone and 0.033 moles of cyclohexanol. This is equivalent to a yield of approximately 69% of cyclohexanone and cyclohexanol based on cyclohexane converted.

The invention claimed is:

1. The process for the conversion of a cycloparaffin to reaction products consisting essentially of the corresponding cyclic alcohols and cyclic ketones which comprises contacting said cycloparaffin with a molecular oxygen-containing gaseous stream at a temperature of from about 100° C. to about 180° C. in the presence of an amount of a monobasic aliphatic carboxylic acid having from 1 to 6 carbon atoms to the molecule in the range of from about 0.005 to about 0.1 mole of said carboxylic acid per mole of said cycloparaffin as essentially the sole catalyst for said conversion.

2. The process for the conversion of a cycloparaffin to reaction products consisting essentially of cyclic alcohols and cyclic ketones corresponding to said cycloparaffin which comprises contacting said cycloparaffin with a molecular oxygen-containing gaseous stream at a temperature of from about 100° C. to about 180° C. in the presence of an amount of acetic acid in the range of from about 0.005 to about 0.1 mole of acetic acid per mole of said cycloparaffin as essentially the sole catalyst for said conversion.

3. The process for the conversion of cyclohexane to reaction products consisting essentially of cyclohexanone and cyclohexanol which comprises contacting said cyclohexane with a molecular oxygen-containing gaseous stream in a reaction zone at a temperature of from about 100° C. to about 180° C. in the presence of an amount of acetic acid within the range of from about 0.005 to 0.1 mole of acetic acid per mole of cyclohexane as essentially the sole catalyst for said conversion, distilling an azeotropic mixture of unconverted cyclohexane and acetic acid from the resulting reaction products, and recycling said azeotropic mixture to the reaction zone.

4. The process for the conversion of cyclohexane to reaction products consisting essentially of cyclohexanone and cyclohexanol which comprises contacting said cyclohexane with a molecular oxygen-containing gaseous stream at a temperature of from about 100° C. to about 180° C. in the presence of an amount of monobasic aliphatic carboxylic acid having from 1 to 6 carbon atoms to the molecule in the range of from about 0.005 to about 0.1 mole of said carboxylic acid per mole of cyclohexane as essentially the sole catalyst for said conversion.

5. The process for the conversion of cyclohexane to reaction products consisting essentially of cyclohexanone and cyclohexanol which comprises contacting said cyclohexane with a molecular oxygen-containing gas stream at a temperature of from about 100° C. to about 180° C. in the presence of a monobasic aliphatic carboxylic acid having from about 1 to about 4 carbon atoms to the molecule, in an amount ranging from about 0.01 to about 0.05 mole of said acid per mole of cyclohexane as essentially the sole catalyst for said conversion.

6. The process for the conversion of cyclohexane to reaction products consisting essentially of cyclohexanone and cyclohexanol which comprises contacting said cyclohexane with a molecular oxygen-containing gaseous stream at a temperature from about 100° C. to about 180° C. in the prescence of an amount of acetic acid in the range of from about 0.05 to about 0.1 moles of acetic acid per mole of cyclohexane as essentially the sole catalyst for said conversion.

7. The process in accordance with claim 6 wherein the total conversion of cyclohexane is maintained in the range of from about 2.5 to 10%.

8. The process for the conversion of cyclohexane to reaction products consisting essentially of cyclohexanone and cyclohexanol which comprises contacting said cyclohexane with a molecular oxygen-containing gaseous stream at a temperature of from about 100° C. to about 180° C. in the presence of an amount of acetic acid in the range of from about 0.01 to about 0.05 mole acetic acid per mole of cyclohexane as essentially the sole catalyst for said conversion.

9. The process for the conversion of cyclohexane to reaction products consisting essentially of cyclohexanone and cyclohexanol which comprises contacting said cyclohexane with a molecular oxygen-containing gaseous stream at a temperature of from about 140° C. to about 165° C. in the presence of an amount of acetic acid in the range of from about 0.01 to about 0.05 mole acetic acid per mole cyclohexane as essentially the sole catalyst for said conversion while maintaining the total conversion of cyclohexane in the range of from about 2.5 to about 10%.

References Cited in the file of this patent

UNITED STATES PATENTS

| Number | Name | Date |
|---|---|---|
| 1,931,501 | Luther et al. | Oct. 24, 1933 |
| 1,947,989 | Hellthaler et al. | Feb. 20, 1934 |
| 2,439,513 | Hamblet et al. | Apr. 13, 1948 |
| 2,492,985 | Grosse et al. | Jan. 3, 1950 |